J. W. DREW.
PUMP PISTON.
APPLICATION FILED JAN. 2, 1918. RENEWED APR. 9, 1920.
1,357,624.
Patented Nov. 2, 1920.
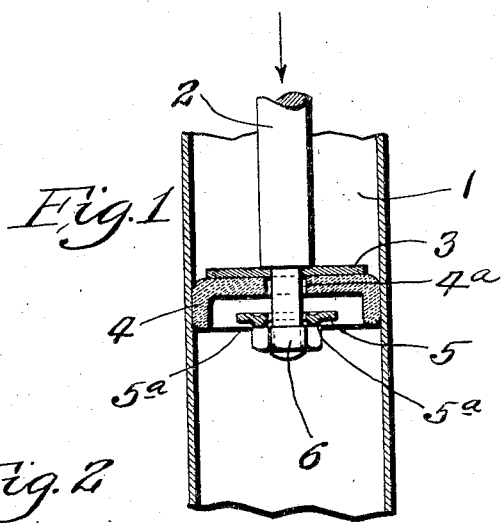
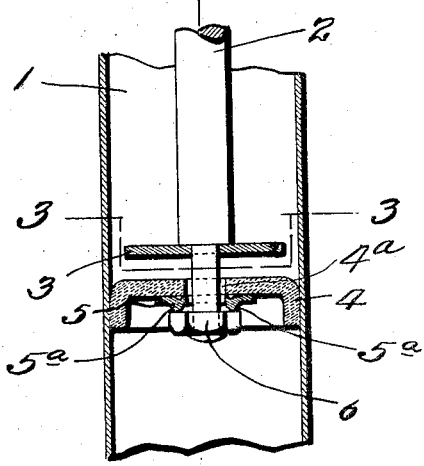
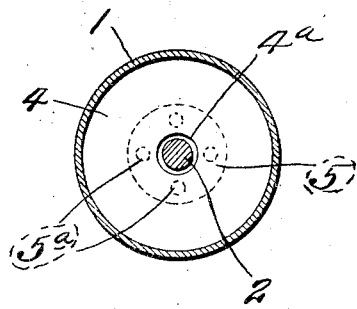
Inventor
John W. Drew

UNITED STATES PATENT OFFICE.

JOHN W. DREW, OF ST. LOUIS, MISSOURI, ASSIGNOR TO MOON BROTHERS MANUFACTURING COMPANY, OF ST. LOUIS, MISSOURI, A CORPORATION OF MISSOURI.

PUMP-PISTON.

1,357,624.    Specification of Letters Patent.    Patented Nov. 2, 1920.

Application filed January 2, 1918, Serial No. 209,848. Renewed April 9, 1920. Serial No. 372,705.

*To all whom it may concern:*

Be it known that I, JOHN W. DREW, a citizen of the United States, residing at city of St. Louis, State of Missouri, have invented a certain new and useful Improvement in Pump-Pistons, of which the following is a full, clear, and exact description, such as will enable others skilled in the art to which it appertains to make and use the same, reference being had to the accompanying drawings, forming part of this specification, in which—

Figure 1 is a vertical sectional view through my improved pump piston showing the same in its compressing position.

Fig. 2 is a similar view showing the cup in its suction position.

Fig. 3 is a cross sectional view on line 3—3 of Fig. 2.

My invention relates generally to air pumps and more particularly to the pistons thereof, the principal object of my invention being to mount the piston on the piston rod so that the former will float or move freely for a limited distance at the ends of the compression and suction strokes, and further, to construct the piston and mount the same upon its rod so that the air on the suction stroke passes through the joint between the piston and piston rod instead of between the edge of said piston and the wall of the cylinder. This construction permits the piston to be constructed of comparatively heavy stock, and, therefore, its life or period of service is much longer than if it were formed of comparatively thin material.

A further object of my invention is to generally improve upon, simplify, and cheapen the cost of manufacture of pump pistons whether used for single, double or triple cylinder pumps.

In the drawings, 1 indicates the pump cylinder, 2 the piston rod which is reduced at its lower end so as to form a shoulder on which is pressed a washer or spacing member 3 of slightly smaller diameter than the interior periphery of the pump periphery.

The numeral 4 designates the cup washer preferably constructed of heavy leather, rubber or analogous material and pressed to proper shape. This cup washer is provided at its center with an aperture $4^a$ which is slightly larger in diameter than the reduced end of the piston rod 2, and thus, when said cup washer is positioned on the piston rod, there is an annular space between the reduced end of said rod and the edge of said aperture $4^a$. This annular space provides a passageway for the air in passing from one side of the cup washer to the other during the suction stroke of the piston.

The numeral 5 designates a washer of such diameter as to fit within the chamber in the underside of the cup washer 4, said washer 5 being free to move on the reduced portion of the piston rod and being provided with depressed portions $5^a$ which form spacing elements to permit air to pass freely through the cup washer when washer 5 is in contact with nut 6. This nut is seated on the lower end of the reduced annulus of the piston rod, said nut being preferably screwed home, that is, to the end of the screw threads, the lower end of the piston rod being upset by the hammering of the same to prevent the accidental displacement of the nut.

The operation of my improved pump piston is very simple; the leather cup pressed to shape before assemblage on the piston rod, is placed in position against the fixed guiding washer, after which the floating spacing washer is arranged in position and then the nut screwed on and the lower end of the piston rod upset. In the compressing stroke of the piston, it will be forced against the guiding washer which is shrunk or driven on the piston rod, so as to compress the air before it and then as the piston rod makes a reverse movement, the floating washer being spaced apart from the nut will permit the air to pass through the aperture $4^a$ in cup washer 4, instead of passing between the flanged edge of said cup washer and the wall of the pump cylinder. This enables the flange on the edge of the cup washer to always fit snugly against the inner surface of the wall of the cylinder, and thereby maintaining a practically air tight joint.

It will be readily understood that minor changes in the size, form and construction of the various parts of my improved pump piston may be made and substituted for those herein shown and described, without departing from the spirit of my invention, the scope of which is set forth in the appended claim.

I claim:

In a pump piston, the combination of a piston rod, a fixed solid backing washer thereon, a cup member having an opening larger than the piston rod and coöperating with said solid backing washer, said cup member being free to move on the piston, a floating washer for supporting the cup in its suction movement, said floating washer having an opening larger than the piston rod, a supporting abutment with which said last mentioned washer coöperates, and projections for spacing said floating washer from its supporting abutment when said parts are in engagement.

In testimony whereof I hereunto affix my signature in the presence of two witnesses, this 28th day of December, 1917.

JOHN W. DREW.

Witnesses:
M. P. SMITH,
M. A. HARDEL.